United States Patent [19]

Pitts

[11] 4,014,224
[45] Mar. 29, 1977

[54] SPEED DIFFERENTIAL PLANETARY GEAR TRAIN

[75] Inventor: Dallas L. Pitts, Wynne, Ark.

[73] Assignee: Pitts Drive, Inc., Wynne, Ark.

[22] Filed: May 12, 1975

[21] Appl. No.: 576,284

Related U.S. Application Data

[63] Continuation-in-part of Ser. No. 405,753, Oct. 12, 1973, abandoned, which is a continuation-in-part of Ser. No. 217,739, Jan. 14, 1972, abandoned.

[52] U.S. Cl. .............................................. 74/805
[51] Int. Cl.² ........................................ F16H 1/28
[58] Field of Search ............................ 74/804, 805

[56] References Cited

UNITED STATES PATENTS

| | | | |
|---|---|---|---|
| 575,880 | 1/1897 | Eichemeyer | 74/805 X |
| 627,382 | 1/1899 | Birrell | 74/805 X |
| 1,320,460 | 11/1919 | Ellett | 74/805 |
| 2,049,696 | 8/1936 | Fliesberg | 74/805 |
| 2,250,259 | 7/1941 | Foote, Jr. | 74/805 |
| 2,256,055 | 9/1941 | Probst | 74/805 X |
| 2,354,386 | 7/1944 | Lawler | 74/805 X |
| 2,991,665 | 7/1961 | Sundt | 74/805 |
| 3,369,672 | 2/1968 | Lorence | 74/805 X |
| 3,429,393 | 2/1969 | Lorence | 74/805 X |
| 3,627,087 | 12/1971 | Eskridge | 74/805 X |

*Primary Examiner*—Samuel Scott
*Assistant Examiner*—Lance W. Chandler
*Attorney, Agent, or Firm*—Wood, Herron & Evans

[57] ABSTRACT

A planetary gear train having four gears that are arranged as two external-internal pairs, in which the two external gears are connected to form a cluster which rotates around a rotatable eccentric, and within the respective internal gears. Certain relations between parameters of the four gears provide high efficiency.

14 Claims, 5 Drawing Figures

MESHING ARC BETWEEN EXTERNAL SPUR GEAR
AND INTERNAL GEAR ALONG LINE OF ACTION AS
A FUNCTION OF SIZE RATIO-STUB TOOTH 20°P.A.

FRICTION LOSS AS A FUNCTION OF
EXTERNAL GEAR SIZE (COMPARED TO MATING INT. GEAR)

SPEED DIFFERENTIAL PLANETARY GEAR TRAIN

This application is a continuation-in-part of patent application Ser. No. 405,753, filed Oct. 12, 1973, now abandoned, which was in turn a continuation-in-part of patent application Ser. No. 217,739, filed Jan. 14, 1972, now abandoned.

This invention concerns a planetary gear train for establishing a large differential between the speeds of rotation of an input member and an output member. In particular, the invention relates to improvements in speed changers having four gears that are arranged as two planetary, or external-internal, gear pairs. (By external gear is meant a gear which is toothed around its external periphery, i.e., a spur gear; by internal gear is meant a gear in the form of a ring which is toothed on its inner peripheral surface.)

In speed changers of this type, each external gear moves along an epicyclic path relative to the internal gear with which it meshes. The two external gears are connected to one another and form a gear cluster, so that both rotate at the same rate about a common axis. This cluster is journaled for rotation around a rotatable eccentric, which in turn is connected to a first shaft or other member for rotation with it. The two internal gears are concentric, but rotate relative to one another. One of the internal gears is connected for rotation with a second shaft or other member. The other internal gear is held in a fixed position and does not rotate.

In use, one of the two shafts is driven by an external source of rotary motion, and constitutes the input shaft. The other shaft delivers rotary motion, at a different rate of rotation, to an external object, and constitutes the output shaft. In general, either shaft may be the input shaft, and the other the output. That is, the input can be applied to an internal gear, or to the external gear cluster; and the output can be taken from the external cluster, or from an internal gear. When the shaft which is connected to the eccentric is the input shaft, the device functions as a speed reducer; where the shaft is connected to the internal gear is the input shaft, the device functions as a speed multiplier.

Differences between the pitch diameters and numbers of teeth of the external gears and the internal gears lead to a difference between the rate of rotation of the output shaft and that of the input shaft.

Gear trains of the type utilizing double planetary external-internal gear pairs are known per se. Such devices are shown in Eickemeyer Ser. No. 575,880; Birrell Ser. No. 627,382; Ellett U.S. Pat. No. 1,320,460; Fliesberg U.S. Pat. No. 2,049,696; Foote U.S. Pat. No. 2,250,259; Probst U.S. Pat. No. 2,256,055; Lawler U.S. Pat. No. 2,354,386; Fox et al U.S. Pat. No. 2,881,619; Sundt U.S. Pat. No. 2,991,665; Lorence U.S. Pat. No. 3,369,672; Lorence U.S. Pat. No. 3,429,393; and Eskridge U.S. Pat. 3,627,087. However, none of these references specify the criteria I have discovered for selection of the parameters of the gears that are to be used, and the particular gears shown do not correspond to the relations stated hereinafter.

Gear trains of this general type possess a number of theoretical advantages in comparison to other trains with a comparable speed ratio. They are relatively compact, light and simple. The input and output members are colinear. Direction of rotation can easily be reversed.

However, despite the advantages that gear trains of this type offer in theory, they have not, insofar as I am aware, found significant commercial application. It is my belief that the reason for this lies in the fact that heretofore trains of this type have had poor mechanical efficiency, such that only a relatively small proportion of the input energy has been transformed into useful output. Internal friction, manifested as heat and wear, have been severe.

It has heretofore generally been believed that the efficiency of fixed-differential gear trains is inherently relatively low. In *Gear Handbook*, McGraw Hill Book Co., 1962, at page 3–25, it is stated that:

"The fixed-differential gears tend to be low in efficiency. The differential has a large amount of tooth meshing going on at very high tooth loads. Losses are much higher than for regular gearing. A fixed differential of 100:1 ratio might have an efficiency as low as 25 percent. With a good design a fairly good efficiency can be obtained."

The same text, at page 14–29, sets forth an equation for estimating the efficiency of a train with ring gears as, $$E = 100 - (\% \text{ loss }_C + \% \text{ loss }_B)(m_R - 1),$$

Where % loss $_C$ is the frictional loss in the cluster-moving gear mesh, and $m_R$ is the reduction ratio or input speed/output speed. A typical friction loss for an internal gear is ½%; thus the efficiency for a large reduction would be expected to be very small, in line with the quoted statement.

As set forth in application Ser. No. 217,739, previously identified and incorporated herein by reference, tests of a gear train of the type shown in Fox et al, U.S. Pat. No. 2,881,619, which does not have parameters in accordance with this invention as hereinafter defined, demonstrates low comparative efficiency of the prior art device.

Surprisingly, and contrarily to the teachings of the art, I have discovered that by use of gear trains having parameters as set forth hereinafter in accordance with this invention, very good efficiencies can be obtained, in excess of 70% and up to 90% in some cases, on the basis of power output compared to power input. By reason of these exceptionally high efficiencies, and the high power/weight ratios demonstrated by trains in accordance with the present invention, these drives are especially useful for helicopter rotor transmissions, lightweight powerful winches, and the like.

This invention is predicated upon the discovery of a range of certain very desirable relations between the gears of the train. Insofar as I have been able to ascertain, these relationships have not previously been known, and they have not been present in any previous gear train.

In the following description, certain terms will be used in accordance with the following standard definitions:

The pitch circle of a gear is a circle having the same diameter as an imaginary cylinder which would transmit by rolling contact the same motion as the gear itself.

The pitch diameter, sometimes hereinafter designated as D, is the diameter of the gear measured at its pitch circle.

The diametral pitch sometimes designated as P, is the number of teeth per inch of diameter of the pitch circle.

The offset E is the distance between the center of the eccentric and the axis about which the eccentric rotates.

More specifically, I have discovered that it is highly desirable to construct the train with gears which bear certain relations to one another in respect to offset distance E, and the diametral pitch.

For purposes of expressing these relationships mathematically, that internal gear which is fixed and does not rotate is designated as F. That external gear which meshes with the fixed gear F is designated as A. The other or second external gear is designated as B. The other or second internal gear, which is rotatable and which is connected to a shaft, is designated as C.

An important element of this invention is that gears having teeth of standard involute shape (as defined by American Gear Manufacturers Association) must be used, and at design pressure angle and with pitch circles tangent (i.e., a standard involute system) instead of non-involute gears or gears at non-standard distances such that their pitch circles are not tangent.

The gear relations which are to be established in a train in accordance with the invention are as follows:

First, for each external-internal gear pair, the offset E must be one-half of the difference between the pitch diameters of the meshing internal and external gears. Thus, $$E = (D_{int} - D_{ext})/2 \qquad (1)$$

The offset must be identical for both gear pairs:

$$E_{F,A} = E_{B,C} \qquad (2)$$

Therefore, $$D_F - D_A = D_C - D_B \qquad (3)$$

The more closely $D_{ext}$ approaches $D_{int}$, the higher the efficiency and the greater the load carrying ability of the train:

$$D_{ext} < D_{int}$$

and $$D_{ext} = D_{int} - 2E < D_{int}. \qquad (4)$$

The possibility of interference between meshing teeth puts a practical limit on the maximum pitch diameter of the external gear relative to the internal gear with which it meshes. For standard involute systems with AGMA stub teeth, interference will begin to occur where the pitch diameter of the external gear equals approximately 90% of the pitch diameter of the internal gear with which it meshes:

$$D_{ext} \leq 0.90\, D_{int} \text{ (for stub tooth systems)} \qquad (4a)$$

If teeth shorter than AGMA stub teeth are used, interference begins at higher values; for standard height teeth, interference begins at lower values.

The pitch diameter of each external gear is to be at least 84% that of the internal gear with which it meshes:

$$D_{ext} = D_{int} - 2E \geq 0.84 D_{int} \qquad (5)$$

As shown hereinafter, as the gear size ratio $D_{ext}/D_{int}$ goes above about 0.84, the efficiency improves increasingly rapidly. The highest efficiencies are achieved where $D_{ext}$ is greater than 0.90 $D_{int}$. To reduce interference at these high ratios, it is desirable, while still using gears of standard involute form at design pressure and with switch circles tangent, to use teeth which are stubbed more than AGMA stub teeth. Moreover, such teeth will be stronger and stiffer, and less machining will be required (cost is lower in quantity).

For stub tooth gears, relations (4a) and (5) may be combined and expressed as:

$$0.84 D_{int} \leq D_{ext} \leq 0.90 D_{int} \qquad (6)$$

The ratio of the speed of the eccentric shaft to the speed of that shaft which is connected to the rotating internal gear is determined by the expression:

$$\frac{\text{Eccentric rpm}}{\text{Internal gear rpm}} = \frac{1}{1 - \left(1 - \frac{2E}{D_C}\right)\left(1 + \frac{2E}{D_A}\right)} \qquad (7)$$

For standard gears, the number of teeth N of a gear is equal to the product of its diametral pitch P and its pitch diameter:

$$N = PD \qquad (8)$$

for each gear.

The pitches of mating gears should match:

$$P_F = P_A \text{ and } P_C = P_B \qquad (9)$$

It is also necessary that the two external gears have different numbers of teeth than one another, otherwise standard involute systems cannot be used. (It will follow that the internal gears will also have different numbers of teeth than one another.)

Each of the foregoing criteria should be met to obtain the advantages of the invention.

For gear pairs of equal pitches, equation (3) can be alternatively expressed, $$\frac{N_F - N_A}{P_{F,A}} = \frac{N_C - N_B}{P_{C,B}} \qquad (10)$$

It is further preferred that both sets of internal-external pairs have the same pitches, for the reason that this gives optimum size and strength relations. This simplifies equation (10) to $$N_F - N_A = N_C - N_B \qquad (11)$$

For the construction of a gear train for a specific application, the preceding equations may be solved by first selecting the desired pitch and approximate pitch diameter of the fixed internal gear F. These parameters will depend upon the load to be transmitted and the available space. P, the number of teeth per inch of pitch diameter, will ordinarily but not necessarily be a whole number and one of the following: 1, 2, 3, 4, 5, 6, 8, 10, and multiples thereof. Usually P will reflect the load transmitted by the gear train.

The diameter of the fixed internal gear F in effect determines the outside diameter of the train. (In this connection, I have found that gearing developed according to my prescription will transmit much greater power than can be carried by spur gear trains or epicyclic trains employing pinions of similar size and pitch.)

Once $P_F$ and $D_F$ have been chosen, $N_F$ is established, for a standard gear, being equal to their product (equation (8)).

Next, the pitch diameter $D_A$ and number of teeth $N_A$ for external gear A are selected so as to satisfy equations 6, 8 and 9.

The values of $D_F$ and $D_A$ establish the offset E, by equation (1).

Once E and $D_A$ are established, equation (7) enables $D_C$ to be determined. $D_B$, $N_C$ and $N_B$ are determined by equations (5) and (8). $N_C$ and $N_B$ are chosen to provide as close a ratio as possible to the particular speed ratio desired. This is usually an iterative process, and may have to be carried out a number of times to arrive at a close approximation of the ratio that is needed.

As previously suggested, the construction of a gear train in accordance with the invention does not require (indeed does not accept) the use of non-involute gears or non-standard systems. Involute gears are used at standard (theoretical) distances from center to center; non-involute gears display very poor efficiency in this type of train.

The invention can best be further explained, and applied to a specific embodiment, by reference to the accompanying drawings in which.

For purposes of explanation, the gear train 10 is illustrated in the operating environment of a chain hoist 11. However, while such trains are especially useful for hoists, it will be understood that the invention is not limited to hoist structure, but can be employed in many other speed change applications, including both reductions and increases.

Figure 1:
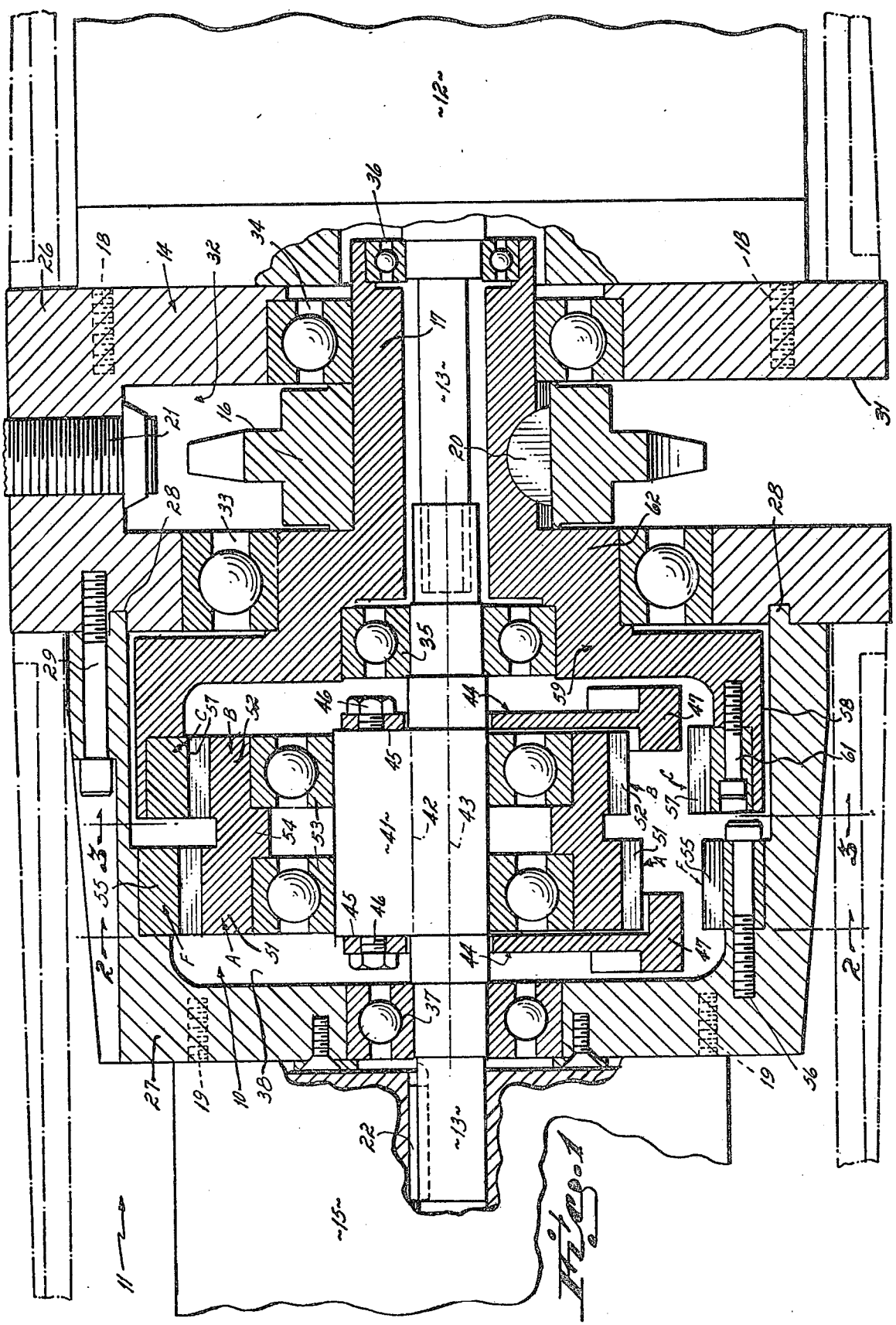
FIG. 1 is an axial section, partly broken away, of a speed differential gear train in accordance with a preferred embodiment of this invention.

The hoisting mechanism 11 illustrated includes an electric motor 12 (controlled by conventional means not shown) that drives a rotatable member or shaft 13 (see particularly FIG. 1), and shaft 13 is, in this embodiment, the input shaft. A pulley sprocket 16 adapted to engage and drive a chain (not shown) is fixed, as by key 20, to a second member or shaft 17 of gear train 10. In this embodiment, shaft 17 is the output shaft. Electric motor 12 is mounted by bolts 18 to one side of a housing or frame by which gear train 10 is supported. In practice, the input may comprise any rotary source, including manual rotation of a crank; the specific type of input is not a part of the invention. The shaft 13 extends through the housing 14 and is adapted to cooperate with an electric brake 15 fixed by bolts 19 to the other side of the housing. Brake 15 may be conventional, and its function is to prevent rotation of shaft 13 when motor 12 is not driving it. Conventional controls cause brake 15 to engage when motor 12 is not operating, and cause the brake to disengage when the motor is energized. Shaft 13 is fixed to the electric motor armature (not shown) on one side of the housing 14 and is fixed, as by key 22, to brake 15 at the other side of the housing.

Output drive shaft 17 for pulley 16 is hollow and of stepped cylindrical configuration, and is telescoped concentrically around input drive shaft 13, adjacent motor 12. Both output shaft 17 and pulley sprocket 16 are coaxially located relative to input shaft 13, and they are adapted to rotate (as will be explained) relative to the input shaft. Housing 14 and, hence, the entire hoisting mechanism 11, is fixed to, for example, an overhead beam or to a trolley (not shown) by bolt or hook 21.

The hoisting mechanism's housing 14 essentially includes a base 26 and a hollow cap 27, the hollow cap presenting an annular boss 28 which seats in a recess defined in the base end face around output shaft 17. Cap 27 is held in fixed engagement with base 26 by bolts 29. The housing's base 26 is slotted, as at 31, in a plane transverse to shaft 13 which passes therethrough. This cross slot 31 thus defines an enclosed archway 32 in which pulley sprocket 16 is positioned, and through which the hoisting chain passes as it is raised or lowered by the mechanism. It will be noted that neither shaft 13 or shaft 17 is directly connected to base 26, and that both are indirectly and rotatably mounted by ball bearing structure. Ball bearings 33, 34 journal shaft 17 for rotation relative to base 26, and inner ball bearings 35, 36 journal input shaft 13 for rotation relative to shaft 17. At the electric brake 15 side of housing 14, shaft 13 is supported for rotation relative to the housing's cap 27 by ball bearings 37.

Figure 2:
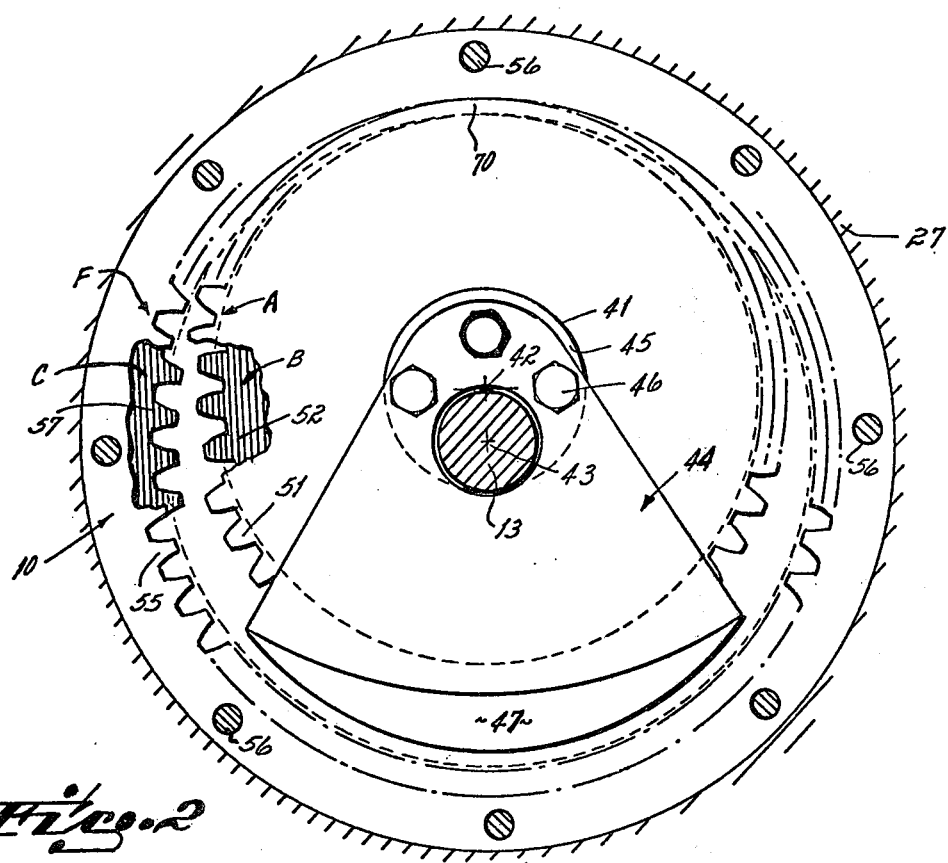
FIG. 2 is a transverse section taken along line 2—2 of FIG. 1.

An eccentric 41, which is cylindrical in cross section, is fixed to shaft 13 and is thereby rotated by the motor. It turns within the gear chamber 38 that is defined by the housing's hollow cap 27. It will be particularly noted that the axis 42 of the eccentric 41 is displaced laterally or radially relative to the axis 43 of input shaft 13, i.e., the eccentric's axis is offset from the input drive shaft's axis, but parallel to the latter. The eccentric 41 is provided with two counterweights 44, each being an arcuate, plate-shaped member, one fixed to each end face 45 of the eccentric by bolts 46 (see FIG. 2). Each counterweight 44 has a crescent or arc shaped mass 47 at its outer rim, which travels in the region between the internal and external gears. The weights of the counterweights are calculated to minimize vibrational stress which might otherwise arise from rotation of the eccentric 41 and external gears about the input shaft axis 43.

The eccentric 41 is rotatable within and relative to first and second external gears 51 and 52, and is journaled therein by ball bearings 53, 53. The two external gears 51 and 52 form a cluster, being intergral or rigidly attached one to the other as at 54, and can be cut from a single blank. These two gears 51, 52 must differ in number of teeth. In the embodiment shown, the pitch diameter of the second external gear is smaller than that of the first external gear, as is apparent in FIG. 1.

The first external gear 51 meshes with a first internal or ring gear 55 disposed around it. In this embodiment, this first internal gear 55 is rigidly fixed to housing cap 27 by bolts 56, and thus does not rotate in operation. It is coaxial with input axis 43. The gear parameters N, P, and D of the first external gear 51 and the first internal gear 55 are related to each other, and to those of the other gear pair, as hereinafter specified; it can be seen that the pitch diameter of the first internal gear is greater than that of the first external gear.

The second external gear 52 is adapted to cooperate with a second internal gear 57, i.e., is disposed within the second internal gear, and is also coaxial with input axis 43. The pitch diameter of the second internal gear is greater than the pitch diameter of the second external gear. Further, the respective pitch diameters of the second gears 52, 57 are less than the pitch diameters of the corresponding first gears 51, 66. However, whereas the first internal gear 55 is fixed to housing 14, the second internal gear 57 is journaled for rotation relative to the housing, and is connected to output shaft 17, and hence, to pulley sprocket 16. The second internal gear 57 is fixed to a skirt 58 on a hat-shaped rotary transfer member 59 by bolts 61. The crown 62 of the member is connected to the output shaft 17. Transfer member 59, output shaft 17, and second internal gear 57 are all symmetrically and coaxially located relative to input axis 43. Transfer member 59 is rotatably carried relative to the input shaft 13 and housing 14 by the bearings 33, 34 on its external surface, as previously mentioned. The pulley sprocket 16 rotates at the same rpm as the second internal gear, since the two are rigidly connected.

Operation of Gear Train

Figure 3:
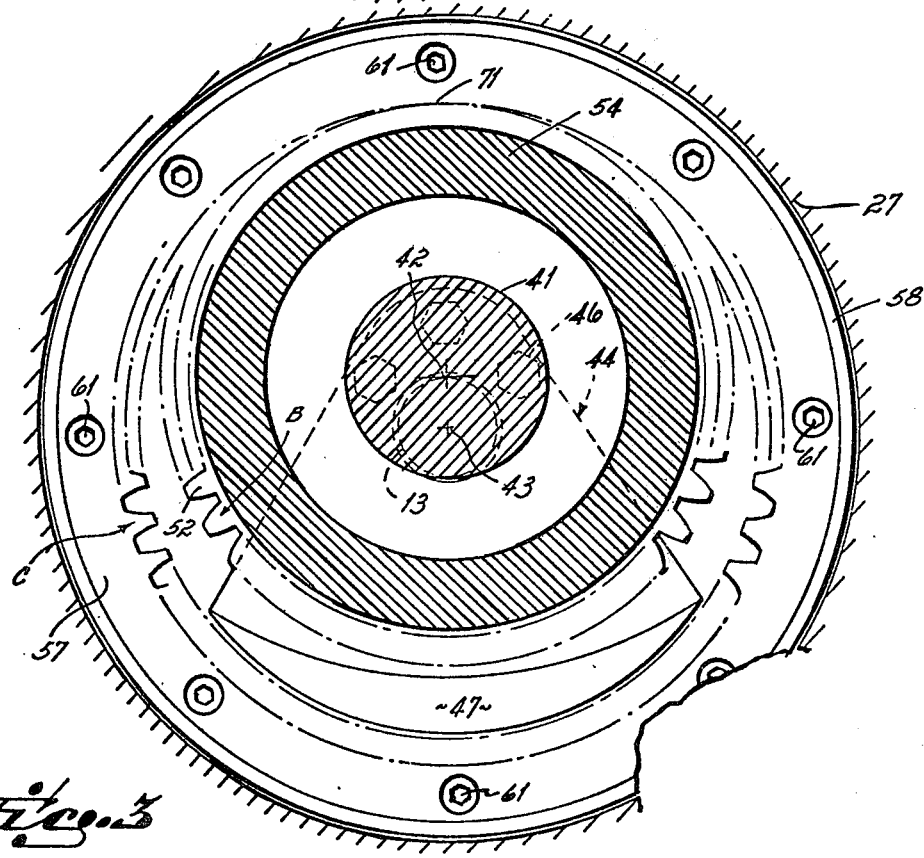
FIG. 3 is a transverse section taken along line 3—3 of FIG. 1.

When electric motor 12 is energized and input shaft 13 is rotated, it will turn the eccentric 41 so that eccentric axis 42 swings about the input axis 43. As this rotation of the eccentric occurs, it can be seen that eccentric counterweight 47, 47 continuously shifts to occupy the moving, crescent-shaped opening between the gears of the pair. In this description, it is assumed that the direction of motor rotation is clockwise, with reference to FIGS. 2 and 3.

Gear cluster 51, 52 is displaced radially by the eccentric from the latter's axis of rotation 43, and this displacement holds one part of the periphery (designated at 70, 71 in FIS. 2 and 3) of each of gears 51 and 52 in engagement with the respective internal gears 55, 57. As eccentric 41 rotates about axis 43, it rolls or turns within the external gear cluster 51, 52, and thus the points of engagement of the cluster gear with the internal gears also move clockwise. While teeth of gear 52 at the radially outermost point 71 on the periphery thereof are held in engagement with the second internal gear 57, in contrast to the first internal gear the latter gear is not fixed, but is rotatable, being mounted to the rotatable output shaft 17. For each turn of input shaft 13, the teeth on gear 51 mesh with all of the teeth on internal gear 55. This induces a rotation of gear 51 about its own orbiting axis 42, in an amount greater than one turn end equal to the ratio of pitch diameter of gear 55 to the pitch diameter of gear 51. The rotation of gear 51 about its axis is transferred exactly to gear 52 since the two are rigidly connected together. However, since gears 57 and 52 have a different ratio of diameters than gears 55 and 51, the only way rotation of gear 52 is possible is for gear 57 to rotate a certain amount to compensate for the difference in diameters of gears 52 and 51. This differential action accounts for the large speed ratios obtainable with the changer.

If, as is illustrated for purposes of explanation, gear 57 is smaller in diameter than gear 55, then the direction of rotation of the output shaft will be the same as that of the input shaft, and shaft 17 and pulley sprocket 16 thereon will rotate in the clockwise direction. If, on the other hand, gear 57 is larger in diameter than gear 55, then the direction of output shaft rotation would be reversed from that of the input shaft.

In accordance with he designations previously established, it can be seen that gear 55 is the fixed gear F, gear 51, which meshes with it, corresponds to designation A, the second internal gear corresponds to designation C, and the second external gear 52 corresponds to designation B.

In general, either of gears 55 or 57 may constitute the fixed gear, the other being connected to shaft 17. If gear 57 is held rather than gear 55, the same general explanation will apply, except that the relation of these gears in the foregoing explanation would be reversed. It should also be understood that either shaft 13 or 17 could constitute the input shaft, and the other the output shaft.

EXAMPLE I

The manner in which the illustrated embodiment satisfies the previously described gear relations, may be seen from the following specific example:

An input/output ratio of approximately 120:1 was desired. The diameter $D_F$ of gear F was established at 4 inches for the particular device to be made. To handle the expected loading, a pitch $P_F$ of 16 was selected, and this same pitch was used for each of the other gears. Thus, using equation (8), $$N_F = D_F P_F = 4 \times 16 = 64$$

In other works, internal gear 55 was a 64-tooth gear with a pitch diameter of 4 inches a pitch of 16. An AGMA standard gear with stub teeth was used.

Next, the mating external gear A for gear F was established, this being the gear 51 in the illustrated embodiment. This was a stub-tooth gear, and conformed to equation (6):

$$0.84\ D_F \leq D_A \leq 0.90\ D_F$$

This establishes $D_A$ as being between 3.360 and 3.600 inches (calculated to the nearest 0.001 inches). Using the relation $N = PD$, the range of acceptable integral numbers for stub teeth was 54 to 57, and $N_A$ was selected as 57, corresponding to $D_A = 3.563$ inches and $D_A/D_F = 0.89$. The offset E is then established:

$$E = \tfrac{1}{2}(D_F - D_A) = 0.219 \text{ inches}$$

$D_B$ and $D_C$ were chosen to provide a close approximation to the 120:1 desired value. $D_C$ is established by equation (7), and $D_B$ by equation (6). Where the ratio was not satisfactory, a new $D_B$ was chosen. In the specific example, $D_B = 3.313$ inches and $D_C = 3,750$, so that $D_B/D_C = 0.88$. With a pitch of 16, $N_B = 53$ and $N_C = 60$. The input/output ratio was 121.7:1, which closely approximated the desired 120 ratio. It is evident that none of the gears had the same number of teeth as any of the others. Both internal-external systems were designated to operate at standard center-to-center gear distance.

It should be noted that, for standard commercial gears, the actual pitch diameters, tooth dimensions, and center distances of the gears will in practice vary slightly from the "theoretical" values, according to the skill and care taken in cutting the gears. Perfect gears are not required. AGMA has set standards of precision that balance the cost of manufacture against the countervening factors of noise and backlash, and they are applicable here. High precision gears are not required, except for the most demanding service.

The gears in accordance with these parameters were operated in standard systems. The gears of each pair fitted together so closely that they could be put in mesh only by sliding them together axially; that is, they could not be brought into engagement by being moved radially toward one another, because the teeth blocked such movement. It is surprising that there is an advantage in using gears which are so nearly equal in size that they interlock in this manner.

A substantial operating advantage is obtained by the use of a counterweight for the eccentric of the type described, because it enables the device to accept a high rate of input rotation (e.g., 2400 rpm) with minimal vibration, and without dynamic instability. The counterweight should best be located diametrically opposite to the points of contact of the respective external gears, with the internal gears.

EXAMPLE II

As previously indicated, it is especially desirable that $D_{ext} > 0.90 D_{int}$. As an example of this high ratio, a train was made with an eccentricity E of 0.125 inch, using gears of 12 pitch. The number of teeth were, $N_F = 41$, $N_A = 38$, $N_B = 36$ and $N_C = 39$ so that $D_A = 0.927 D_F$ and $D_B = 0.923 D_C$. The gear teeth were of standard involute shape and the gears were at design pressure angle with pitch circles tangent. The teeth were modified by slight shortening and by tip relief. The reduction ratio of this train was 247:1.

It is my belief that the unexpectedly high efficiencies which are obtained in accordance with this invention are a result of minimal power losses, and canbe explained as follows: The time span during which a single tooth of the external gear is meshing with the internal gear, is related to the relative motion of the two gears. The greatest relative motion occurs between external gear A which meshes with the fixed internal gear F. The number of times a single tooth of gear A meshes with gear F (for a single rotation of the eccentric) is given by $N_F/N_A$. The duration of a mesh of one tooth, at a predetermined rpm, is given directly by the arc over which meshing takes place, defined here as the arc between the first and last intersections of the addendum circles of the external gear and its mating internal gear.

The power loss due to friction is determined by the product of the sliding velocity and the friction force. For a given lubrication system the friction force is determined by the transmitted torque and the pressure angle of the gear set. The mesh velocity is inversely proportional to the mesh arc, and for the specific mesh velocity, the sliding velocity is zero at the pitch line for involute gears at theoretical center distances. Sliding velocity increases as meshing occurs on either side of the pitch line. For simplicity it can be taken that sliding velocity increases linearly as the mesh point departs from the pitch line. The amount of such departure (degree of sliding) is a function of the length of actual tooth action (about two tooth spaces) divided by the meshing arc.

Thus, sliding velocity is determined by mesh velocity which in turn is proportional to the inverse of mesh arc. Sliding velocity is also proportional to contact length/mesh arc The contact length is very nearly a constant in the range relevant here.

Friction loss is some factor times $1/(\text{mesh arc})^2$

Figure 4:
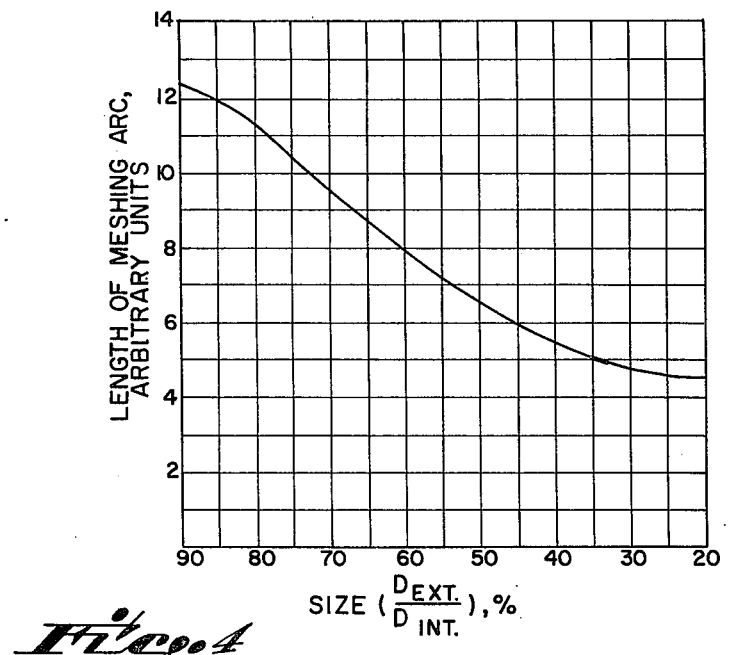
FIG. 4 is a diagram showing the relation between gear size ratio and mesh arc length along the line of action, for a particular external/internal gear pair.
Figure 5:
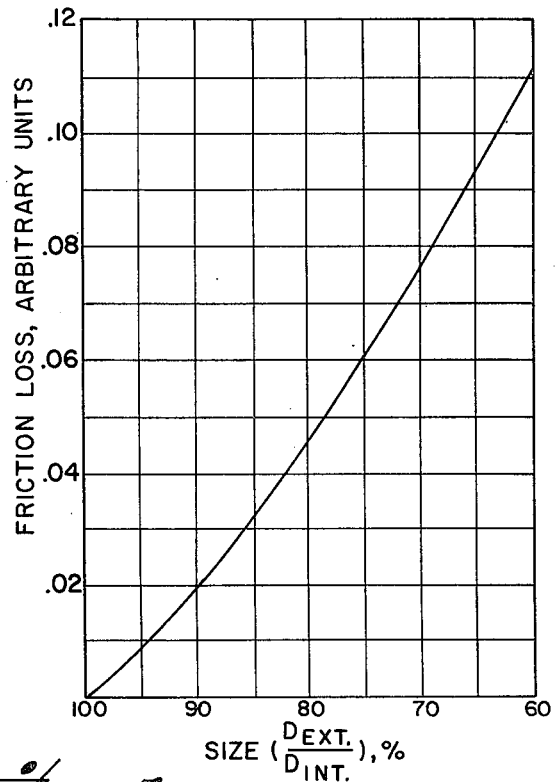
FIG. 5 is a diagram showing the relation between gear size ratio and friction loss for an external/internal gear pair.

The instance of an external gear of the same size as the internal gear can be taken as a datum point for power loss. Losses can than be defined as a factor above that level. FIG. 4 shows length of meshing arc between mating gears of different sizes. It is possible to obtain an estimate of comparative friction loss as a function of external gear size in comparison to the size of the mating internal gear. FIG. 5 shows this. The figure shows a loss at 90% size ratio of about 0.02, and at 84% of about 0.034. From FIG. 4 (which is diagrammatic and not to exact scale) it can be seen that an inflection point occurs on the curve at about this point, such that the rate of change of mesh arc reverses with further size ratio change. Below the inflection point mesh arc changes more and more slowly, and the avoidable losses increase increasingly rapidly. At 75% losses are about 0.06, or three times the losses at 90% size.

More generally, the advantages derived from gear selection in accordance with the foregoing parameters are believed to result from the large arc of contact which in turn results in force being transmitted only near the pitch line where true involute action occurs with almost zero sliding. In other words, gears selected in accordance with this invention in effect confine power transmission to an area very near the pitch line, and get smooth power flow. Although this is important in any gear train, this is apparently extremely important in a differential train, since both sets of gears sense output torque and input speed. Non-standard gears have found ready acceptance in regular spur gearing, but the losses are intolerable where they are used in a differential type reducer. In essence, the high efficiencies of this invention are obtained because a way has been found to insure that frictional losses from individual tooth meshes will be extremely small.

In the past, rather than using an external gear which in so nearly equal in pitch diameter to the internal gear with which it meshes, it has been common to use an external gear which is smaller in size ratio. Doing so avoids the "interlocking mesh" of teeth mentioned previously, but contrary to expectations, it sharply reduces efficiency. In contrast, the large D ratio used for standard gear systems having unequal tooth members and E values in accordance with this invention, enables surprisingly high efficiencies to be obtained.

Having described my invention, what is claimed is:

1. A speed differential planetary gear train comprising,
   a first rotatable shaft connected to an eccentric for rotation therewith, the eccentric rotating about the axis of the first shaft.
   a two gear cluster comprising a first external gear and a second external gear, said cluster being journaled on said eccentric for rotation about the axis of the eccentric, said first external gear meshing and rotating within a first internal gear disposed around it, thereby forming a first gear system, said second external gear meshing and rotating within a second internal gear disposed around it, thereby forming a second gear system, means preventing rotation of one of said internal gears, and means connecting the other of said internal gears to a second shaft for rotation therewith, said second shaft having an axis of rotation which is colinear with the axis of rotation of the first shaft, the two said systems both being standard involute systems with $N = PD$ for each gear, said external gears having different numbers of teeth, the gears of the said train being further related substantially in accordance with the following equations:

1) $E = (D_{int} - D_{ext})/2$

2) $F_{F,A} = E_{B,C}$

3) $0.84\, D_{int} \leq D_{ext}$ 4) speed ratio $= \dfrac{1}{1 - \left(1 - \dfrac{2E}{D_C}\right)\left(1 + \dfrac{2E}{D_A}\right)}$ wherein $N$ is an integer equal to the number of teeth on the respective gear;

$P$ is the diametral pitch of the respective gear;

$D$ is the gear diameter;

$E$ is the offset between the center of the eccentric and the axis about which the eccentric rotates;

the non-rotating internal gear is designated as $F$;

the external gear which meshes with the non-rotating internal gear is designated as $A$;

the other external gear is designated as $B$;

and the other internal gear is designated as $C$.

2. The gear train of claim 1 wherein the gear teeth are stub teeth and $$D_{ext} \leq 0.90_{int}$$

3. The gear train of claim 1 wherein each of the gears has the same pitch.

4. The gear train of claim 1 wherein the diametral pitch $P$ of each said gear is a whole number selected from the group consisting of 2, 3, 4, 5, 6, 8, 10, and multiples thereof.

5. The gear train of claim 1 wherein the first shaft is colinear with the second shaft.

6. The gear train of claim 1 wherein the internal gear which is not restrained from rotating, is connected to turn a chain sprocket.

7. The gear train of claim 1 wherein an electric motor is connected to turn said first shaft, and a brake is connected to lock said first shaft against rotation when said electric motor is not energized.

8. The gear train of claim 1 wherein input rotation is supplied to said first shaft, and rotational power is delivered by said second shaft.

9. The gear train of claim 1 wherein said first shaft passes through and is journaled for rotation within and relative to said second shaft.

10. The gear train of claim 1 wherein meshing gears have the same pitches.

11. The gear train of claim 1 wherein the speed reduction ratio is greater than 30:1.

12. The gear train of claim 1 wherein the train has an operating efficiency in excess of 70%.

13. The gear train of claim 1 which includes a counterbalance for the eccentric, said counterbalance being connected to the eccentric and being positioned in the space between the internal and external gears, diametrically opposed to the point of engagement of said gears.

14. The gear train of claim 1, wherein each of said gears has a different number of teeth than all of the others.

* * * * *